US009765647B2

(12) United States Patent
Ives et al.

(10) Patent No.: US 9,765,647 B2
(45) Date of Patent: Sep. 19, 2017

(54) HYDROELECTRIC TURBINE RECOVERY SYSTEM AND A METHOD THEREFOR

(75) Inventors: James Ives, Dublin (IE); Paul Dunne, Dublin (IE)

(73) Assignee: Openhydro IP Limited, Dublin (IE)

( * ) Notice: Subject to any disclaimer, the term of this patent is extended or adjusted under 35 U.S.C. 154(b) by 832 days.

(21) Appl. No.: 13/884,219

(22) PCT Filed: Nov. 8, 2011

(86) PCT No.: PCT/EP2011/069623
§ 371 (c)(1),
(2), (4) Date: Aug. 27, 2013

(87) PCT Pub. No.: WO2012/062739
PCT Pub. Date: May 18, 2012

(65) Prior Publication Data
US 2013/0343869 A1   Dec. 26, 2013

(30) Foreign Application Priority Data
Nov. 9, 2010  (EP) ..................... 10190576

(51) Int. Cl.
*F01D 25/28* (2006.01)
*F03B 13/26* (2006.01)
(Continued)

(52) U.S. Cl.
CPC ............ *F01D 25/28* (2013.01); *F03B 13/264* (2013.01); *F03B 17/061* (2013.01); *B63B 27/10* (2013.01);
(Continued)

(58) Field of Classification Search
CPC .............. F05B 2240/97; F05B 2230/60; F05B 2230/70; F05B 2230/80; F01D 25/28;
(Continued)

(56) References Cited

U.S. PATENT DOCUMENTS 228,467 A    6/1880  Maclay
928,536 A    7/1909  Pino
(Continued)

FOREIGN PATENT DOCUMENTS

CA    2388513    8/2000
CA    2352673    1/2003
(Continued)

OTHER PUBLICATIONS

Megson, T.H.G. Structural and Stress Analysis. Elsevier. p. 101-113. 1996.
(Continued)

*Primary Examiner* — Mark Laurenzi
*Assistant Examiner* — Brandon Lee
(74) *Attorney, Agent, or Firm* — Gardner, Linn, Burkhart & Flory, LLP

(57) ABSTRACT

The present invention relates to a hydroelectric turbine recovery system, and in particular a system which significantly reduces the complexity of recovering a base mounted hydroelectric turbine from a deployment site on the seabed by providing a frame having an open mouth which can be advanced around the turbine before the frame is fully lowered into locking engagement with the base, thereby allowing the base, with the turbine thereon, to be recovered from the seabed.

18 Claims, 8 Drawing Sheets

(51) Int. Cl.
*F03B 17/06* (2006.01)
*B63B 27/10* (2006.01)

(52) U.S. Cl.
CPC ........ *F05B 2230/60* (2013.01); *F05B 2230/70* (2013.01); *F05B 2230/80* (2013.01); *F05B 2240/97* (2013.01); *Y02E 10/28* (2013.01); *Y02P 70/527* (2015.11)

(58) Field of Classification Search
CPC ...... F03B 13/264; F03B 17/061; B63B 27/10; Y02E 10/28; Y02P 70/527
See application file for complete search history.

(56) References Cited

U.S. PATENT DOCUMENTS

| | | | |
|---|---|---|---|
| 1,710,103 | A | 4/1929 | Nelson |
| 2,054,142 | A | 9/1936 | Sharp |
| 2,470,797 | A | 5/1949 | Thomas |
| 2,501,696 | A | 3/1950 | Souczek |
| 2,563,279 | A | 8/1951 | Rushing |
| 2,658,453 | A | 11/1953 | Walters |
| 2,782,321 | A | 2/1957 | Fischer |
| 2,792,505 | A | 5/1957 | Baudry |
| 2,874,547 | A | 2/1959 | Fiore |
| 3,078,680 | A | 2/1963 | Wapsala |
| 3,209,156 | A | 9/1965 | Struble, Jr. |
| 3,292,023 | A | 12/1966 | Korber |
| 3,342,444 | A | 9/1967 | Nelson |
| 3,355,998 | A | 12/1967 | Roemisch |
| 3,384,787 | A | 5/1968 | Schwartz |
| 3,422,275 | A | 1/1969 | Braikevitch et al. |
| 3,433,024 | A | 3/1969 | Diamond et al. |
| 3,477,236 | A | 11/1969 | Burrus |
| 3,487,805 | A | 1/1970 | Satterthwaite et al. |
| 3,603,386 | A * | 9/1971 | Talley, Jr. ............... E21B 41/10 166/351 |
| 3,708,251 | A | 1/1973 | Pierro |
| 3,986,787 | A | 10/1976 | Mouton, Jr. et al. |
| 3,987,638 | A | 10/1976 | Burkhardt et al. |
| 4,095,918 | A | 6/1978 | Mouton et al. |
| 4,163,904 | A | 8/1979 | Skendrovic |
| 4,219,303 | A | 8/1980 | Mouton, Jr. et al. |
| 4,274,009 | A | 6/1981 | Parker, Sr. |
| 4,367,413 | A | 1/1983 | Nair |
| 4,421,990 | A | 12/1983 | Heuss et al. |
| 4,427,897 | A | 1/1984 | Migliori |
| 4,496,845 | A | 1/1985 | Ensign et al. |
| 4,523,878 | A | 6/1985 | Richart et al. |
| 4,541,367 | A | 9/1985 | Lindberg |
| 4,541,755 | A * | 9/1985 | Castel ..................... E21B 41/10 166/341 |
| 4,613,762 | A | 9/1986 | Soderholm |
| 4,720,640 | A | 1/1988 | Anderson |
| 4,740,711 | A | 4/1988 | Sato et al. |
| 4,744,697 | A | 5/1988 | Coppens |
| 4,744,698 | A | 5/1988 | Dallimer et al. |
| 4,810,135 | A | 3/1989 | Davenport et al. |
| 4,867,605 | A | 9/1989 | Myers et al. |
| 4,868,408 | A | 9/1989 | Hesh |
| 4,868,970 | A | 9/1989 | Schultz et al. |
| 4,990,810 | A | 2/1991 | Newhouse |
| 5,495,221 | A | 2/1996 | Post |
| 5,592,816 | A | 1/1997 | Williams |
| 5,606,791 | A | 3/1997 | Fougere et al. |
| 5,609,441 | A | 3/1997 | Khachaturian |
| 5,656,880 | A | 8/1997 | Clark |
| 5,662,434 | A | 9/1997 | Khachaturian |
| 5,715,590 | A | 2/1998 | Fougere et al. |
| 5,800,093 | A | 9/1998 | Khachaturian |
| 5,998,905 | A | 12/1999 | Fougere et al. |
| 6,039,506 | A | 3/2000 | Khachaturian |
| 6,109,863 | A | 8/2000 | Milliken |
| 6,113,314 | A | 9/2000 | Campbell |
| 6,166,472 | A | 12/2000 | Pinkerton |
| 6,168,373 | B1 | 1/2001 | Vauthier |
| 6,232,681 | B1 | 5/2001 | Johnston et al. |
| 6,242,840 | B1 | 6/2001 | Denk et al. |
| 6,293,734 | B1 | 9/2001 | Thomas et al. |
| 6,300,689 | B1 | 10/2001 | Smalser |
| 6,309,179 | B1 | 10/2001 | Holden |
| 6,367,399 | B1 | 4/2002 | Khachaturian |
| 6,406,251 | B1 | 6/2002 | Vauthier |
| 6,409,466 | B1 | 6/2002 | Lamont |
| 6,445,099 | B1 | 9/2002 | Roseman |
| 6,476,709 | B1 | 11/2002 | Wuidart et al. |
| 6,612,781 | B1 | 9/2003 | Jackson |
| 6,648,589 | B2 | 11/2003 | Williams |
| RE38,336 | E | 12/2003 | Williams |
| 6,729,840 | B2 | 5/2004 | Williams |
| 6,756,695 | B2 | 6/2004 | Hibbs et al. |
| 6,770,987 | B1 | 8/2004 | Sogard et al. |
| 6,777,851 | B2 | 8/2004 | Maslov |
| 6,806,586 | B2 | 10/2004 | Wobben |
| 6,840,713 | B1 | 1/2005 | Schia et al. |
| 6,843,191 | B1 | 1/2005 | Makotinsky |
| 6,857,821 | B2 | 2/2005 | Steenhuis et al. |
| 6,957,947 | B2 | 10/2005 | Williams |
| 7,190,087 | B2 | 3/2007 | Williams |
| D543,495 | S | 5/2007 | Williams |
| 7,223,137 | B1 | 5/2007 | Sosnowski |
| 7,275,891 | B2 | 10/2007 | Owen et al. |
| 7,352,078 | B2 | 4/2008 | Gehring |
| 7,378,750 | B2 | 5/2008 | Williams |
| 7,425,772 | B2 | 9/2008 | Novo Vidal |
| 7,471,009 | B2 | 12/2008 | Davis et al. |
| 7,527,006 | B2 | 5/2009 | Khachaturian |
| 7,611,307 | B2 | 11/2009 | Owen et al. |
| 7,845,296 | B1 | 12/2010 | Khachaturian |
| 7,874,788 | B2 | 1/2011 | Stothers et al. |
| 7,976,245 | B2 | 7/2011 | Finnigan |
| 8,022,581 | B2 | 9/2011 | Stiesdal |
| 8,308,422 | B2 | 11/2012 | Williams |
| 8,310,077 | B2 | 11/2012 | Pearce |
| 8,350,400 | B2 | 1/2013 | Rosefsky |
| 8,466,595 | B2 | 6/2013 | Spooner |
| 2002/0034437 | A1 | 3/2002 | Williams |
| 2002/0062644 | A1 | 5/2002 | Rosefsky |
| 2002/0088222 | A1 | 7/2002 | Vauthier |
| 2003/0044272 | A1 | 3/2003 | Addie et al. |
| 2003/0137149 | A1 | 7/2003 | Northrup et al. |
| 2003/0155829 | A1 | 8/2003 | McMullen et al. |
| 2003/0168864 | A1 | 9/2003 | Heronemus et al. |
| 2003/0193198 | A1 | 10/2003 | Wobben |
| 2003/0218338 | A1 | 11/2003 | O'Sullivan et al. |
| 2004/0021386 | A1 | 2/2004 | Swett |
| 2004/0021437 | A1 | 2/2004 | Maslov et al. |
| 2004/0201299 | A1 | 10/2004 | Naritomi et al. |
| 2004/0227500 | A1 | 11/2004 | O'Meara |
| 2004/0232792 | A1 | 11/2004 | Erfourth |
| 2004/0262926 | A1 | 12/2004 | Hansen |
| 2005/0005592 | A1 | 1/2005 | Fielder |
| 2005/0031442 | A1 | 2/2005 | Williams |
| 2006/0261597 | A1 | 11/2006 | Gehring |
| 2007/0018459 | A1 | 1/2007 | Williams |
| 2007/0063448 | A1 | 3/2007 | Kowalczyk |
| 2007/0164626 | A1 | 7/2007 | Taniguchi et al. |
| 2007/0231072 | A1 | 10/2007 | Jennings et al. |
| 2007/0241566 | A1 | 10/2007 | Kuehnle |
| 2007/0262668 | A1 | 11/2007 | Brisson et al. |
| 2007/0291426 | A1 | 12/2007 | Kasunich et al. |
| 2008/0012538 | A1 | 1/2008 | Stewart et al. |
| 2009/0162144 | A1 | 6/2009 | Ayre |
| 2009/0278357 | A1 | 11/2009 | Williams |
| 2010/0068037 | A1 | 3/2010 | Ives |
| 2010/0133838 | A1 | 6/2010 | Borgen |
| 2010/0148513 | A1 * | 6/2010 | Susman ............... F03B 13/264 290/54 |
| 2010/0172698 | A1 | 7/2010 | Ives et al. |
| 2010/0201129 | A1 | 8/2010 | Holstein et al. |
| 2010/0232885 | A1 | 9/2010 | Ives et al. |
| 2010/0295388 | A1 | 11/2010 | Ives et al. |
| 2011/0018274 | A1 | 1/2011 | Ives et al. |
| 2011/0088253 | A1 | 4/2011 | Ives et al. |

(56) References Cited

U.S. PATENT DOCUMENTS

| | | |
|---|---|---|
| 2011/0110770 A1 | 5/2011 | Spooner et al. |
| 2011/0155682 A1* | 6/2011 | Grassow ............... B63B 27/10 212/270 |
| 2011/0291419 A1 | 12/2011 | Dunne et al. |
| 2011/0293399 A1 | 12/2011 | Dunne et al. |
| 2011/0298216 A1 | 12/2011 | Ives et al. |
| 2011/0304148 A1 | 12/2011 | Dunne et al. |
| 2011/0305518 A1 | 12/2011 | Pearce et al. |
| 2012/0027522 A1 | 2/2012 | Ives et al. |
| 2012/0175877 A1 | 7/2012 | Ives et al. |
| 2012/0187680 A1 | 7/2012 | Spooner et al. |
| 2012/0235412 A1 | 9/2012 | Dunne et al. |
| 2012/0280506 A1 | 11/2012 | Ives et al. |
| 2014/0102189 A1 | 4/2014 | Dunne et al. |

FOREIGN PATENT DOCUMENTS

| | | | |
|---|---|---|---|
| CH | 260699 | 4/1947 | |
| CH | 146935 | 8/1983 | |
| DE | 3116740 | 11/1982 | |
| DE | 3638129 | 5/1988 | |
| DE | 3718954 | 12/1988 | |
| DE | 19948198 | 4/2001 | |
| DE | 10101405 | 7/2002 | |
| DE | 20308901 | 9/2003 | |
| DE | 10244038 | 4/2004 | |
| DE | 102007016380 | 10/2008 | |
| DE | 102008032625 B3 | 8/2009 | |
| DE | 102008020965 A1 | 10/2009 | |
| EP | 1318299 | 12/2003 | |
| EP | 1564455 | 1/2005 | |
| EP | 1691377 | 2/2006 | |
| EP | 1876350 | 1/2008 | |
| EP | 1878912 | 1/2008 | |
| EP | 1878913 | 1/2008 | |
| EP | 1879280 | 1/2008 | |
| EP | 1878911 | 9/2008 | |
| EP | 1980670 A1 | 10/2008 | |
| EP | 1992741 | 11/2008 | |
| EP | 1885047 | 12/2008 | |
| EP | 2088311 | 8/2009 | |
| EP | 2110910 | 10/2009 | |
| EP | 2112370 | 10/2009 | |
| EP | 1980746 | 6/2010 | |
| EP | 2199199 | 6/2010 | |
| EP | 2199598 | 6/2010 | |
| EP | 2199599 | 6/2010 | |
| EP | 2199601 | 6/2010 | |
| EP | 2199602 | 6/2010 | |
| EP | 2199603 | 6/2010 | |
| EP | 2200170 | 6/2010 | |
| EP | 2071709 | 9/2010 | |
| EP | 2209175 | 9/2010 | |
| EP | 2241749 | 10/2010 | |
| EP | 2302204 | 3/2011 | |
| EP | 2302755 | 3/2011 | |
| EP | 2302766 | 3/2011 | |
| FR | 2823177 | 10/2002 | |
| FR | 2880389 | 1/2005 | |
| FR | 2859495 | 3/2005 | |
| GB | 204505 | 10/1923 | |
| GB | 924347 | 4/1963 | |
| GB | 980575 | 1/1965 | |
| GB | 1131352 | 10/1968 | |
| GB | 1413835 | 11/1975 | |
| GB | 2316461 | 2/1998 | |
| GB | 2344843 | 6/2000 | |
| GB | 2408294 | 5/2005 | |
| GB | 2431628 | 5/2007 | |
| GB | 2434413 | 7/2007 | |
| GB | 2447514 | 9/2008 | |
| GB | 2471257 A | 12/2010 | |
| IE | WO 2009127415 A1 * | 10/2009 | ............... H02G 1/10 |
| JP | 59203881 | 11/1984 | |
| JP | 63055370 | 3/1988 | |
| JP | 01043908 | 2/1989 | |
| JP | 2000341818 | 12/2000 | |
| JP | 2005069025 | 3/2005 | |
| JP | 2005248822 | 9/2005 | |
| JP | 2006094645 | 4/2006 | |
| JP | 2007255614 | 10/2007 | |
| JP | 2007291882 | 11/2007 | |
| WO | WO9844372 | 10/1998 | |
| WO | WO9852819 | 11/1998 | |
| WO | WO9966623 | 12/1999 | |
| WO | WO0077393 | 12/2000 | |
| WO | WO 0134973 | 5/2001 | |
| WO | WO0134977 | 5/2001 | |
| WO | WO02099950 | 12/2002 | |
| WO | WO03014561 | 2/2003 | |
| WO | WO03025385 | 3/2003 | |
| WO | WO03046375 | 6/2003 | |
| WO | WO2004015264 | 2/2004 | |
| WO | WO2004027257 | 4/2004 | |
| WO | WO2004107549 | 12/2004 | |
| WO | WO2004113717 | 12/2004 | |
| WO | WO2005045243 | 5/2005 | |
| WO | WO2005061887 | 7/2005 | |
| WO | WO2005078233 | 8/2005 | |
| WO | WO2005080789 | 9/2005 | |
| WO | WO2005116443 | 12/2005 | |
| WO | WO2006029496 | 3/2006 | |
| WO | WO2007043894 | 4/2007 | |
| WO | WO2007055585 | 5/2007 | |
| WO | WO2007083105 | 7/2007 | |
| WO | WO2007086814 | 8/2007 | |
| WO | WO2007125349 | 11/2007 | |
| WO | WO2008004877 | 1/2008 | |
| WO | WO2008006614 | 1/2008 | |
| WO | WO2008050149 | 5/2008 | |
| WO | WO2008081187 | 7/2008 | |
| WO | 2008110811 A2 | 9/2008 | |
| WO | WO2008127114 | 10/2008 | |
| WO | WO2009/016409 | 2/2009 | |
| WO | WO2010118766 | 10/2010 | |
| WO | WO2011039249 | 4/2011 | |
| WO | WO2011039255 | 4/2011 | |
| WO | WO2011039267 | 7/2011 | |

OTHER PUBLICATIONS

International Search Report completed Feb. 15, 2012, from corresponding International Application No. PCT/EP2011/069623.

* cited by examiner

HYDROELECTRIC TURBINE RECOVERY SYSTEM AND A METHOD THEREFOR

FIELD OF THE INVENTION

The present invention relates to a hydroelectric turbine recovery system, and in particular a system that significantly reduces the complexity of recovering a base mounted hydroelectric turbine from a deployment site on the seabed or the like.

BACKGROUND OF THE INVENTION

Due to the environmental damage that has been inflicted on the planet as a result of the burning of fossil fuels, renewable energy has finally begun to be given significant attention, with many projects being developed around solar energy, wind energy, and tidal power. Of these alternative forms of energy, tidal power is arguably the most attractive, given that tidal flows are entirely predictable and constant, unlike wind or solar energy which are relatively intermittent and therefore less dependable.

However, harnessing tidal energy does provide its own challenges, in particular with respect to the installation, maintenance and retrieval of tidal power generators, for example hydro-electric turbines, which by the very nature of the operation of same must be located in relatively fast flowing tidal currents, and more than likely located on the seabed. In addition, in order to be economically viable these turbines must be built on a large scale. As a result the turbines and associated bases/supports are large components, and require heavy lifting and transport equipment in order to achieve both deployment and recovery thereof. The use of such heavy lifting equipment is normally a hazardous undertaking, and is rendered even more dangerous when this equipment is operated at sea under difficult and unsteady conditions.

The above processes are further complicated by an increasing shortage in the market of suitable vessels and equipment to perform such work and the extreme danger of engaging divers in high tidal flow sites.

DE102008032625 discloses a lifting device for a turbine generator unit that is adapted to lift a turbine off a seabed mounted base with the base being left fixed on the seabed. The device has an immersion component (1) comprising a transverse centering device (9) and a gripping device (10). The transverse centering device comprises movable enclosure elements that are opened outwardly while the lifting device is brought into position about the generator unit, and are then closed in order to centre the lifting device relative to a turbine generator unit (2). The turbine generator unit can then be lifted off the base, which remains in position on the seabed.

The present invention has therefore been developed with a view to simplifying the recovery of a base mounted hydroelectric turbine system, and in particular reducing the complexity and the time taken to effect recovery of the base and turbine, as a single unit, from the seabed.

SUMMARY OF THE INVENTION

According to a first aspect of the present invention there is provided a hydroelectric turbine recovery system for recovering a base mounted hydroelectric turbine, the system comprising a frame having an opening permitting the frame to be advanced around the turbine via the opening; characterised in that the frame comprises a plurality of couplers engagable with the base.

Preferably, the base comprises corresponding couplers engagable with the plurality of couplers on the frame.

Preferably, the couplers on the frame and the couplers on the base are arranged to be brought into registration through vertical movement relative to one another.

Preferably, the frame is substantially U shaped.

Preferably, the frame comprises one or more guides to assist in aligning the frame with the base.

Preferably, the one or more guides are immovably fixed in position.

Preferably, at least one of the guides comprises a buffer positioned to engage the turbine and/or base when the frame is substantially aligned with the base in order to arrest further displacement of the fame relative to the base.

Preferably, the buffer comprising a cross member extending between a pair of opposed arms of the frame.

Preferably, the buffer is resiliently deformable in order to prevent damage to the turbine and/or base on contact therewith.

Preferably, the couplers on the frame each comprise a hydraulically actuated lifting tool and the couplers on the base each comprise a corresponding dock within which the lifting tool is reversibly lockable.

Preferably, the couplers on the frame and/or base are secured by mountings which permit limited displacement of the couplers.

Preferably, the system comprises one or more sensors operable to detect contact and correct alignment between the frame and the turbine and/or base.

Preferably, the system comprises one or more imaging sensors.

According to a second aspect of the present invention there is provided a method of recovering a base mounted hydroelectric turbine from the seabed, the method comprising the steps of:

lowering a recovery frame having an opening from a deployment vessel into a position laterally adjacent the base mounted turbine;

advancing the frame around the turbine via the opening;

coupling the frame to the base; and lifting the base and turbine off the seabed as a single unit.

Preferably, the method comprises, prior to the step of coupling the frame to the base, substantially vertically lowering the frame into engagement with the base.

Preferably, the method comprises the step of:

arresting the lateral displacement of the frame, when substantially aligned with the base, through contact with the turbine of a buffer mounted to the frame.

Preferably, the method comprises, in the step of coupling the frame to the base, inserting a plurality of couplers on the frame into a corresponding plurality of couplers on the base.

Preferably, the method comprises the step of performing the method in a running tide; and positioning the recovery frame down tide of the turbine prior to lowering the frame into position laterally adjacent the turbine.

Preferably, the method comprises the step of providing power to the recovery frame via a power cable connected between the deployment vessel and the frame; and managing the cable by positioning the cable in the water down tide of the frame.

DETAILED DESCRIPTION OF THE DRAWINGS

Referring now to the accompanying drawings there is illustrated a hydroelectric turbine recovery system, generally indicated as 10, for use in retrieving a hydroelectric turbine T and base B, in a single operation, from a deployment site on the seabed or the like.

The recovery system 10 comprises a frame 12 that is suspended beneath a deployment vessel such as a barge (not shown) or the like and can be raised and lowered relative to the barge on a number of guidelines 14. The guidelines 14 may also carry power, whether electric, hydraulic, pneumatic or the like, from the barge to the frame 12, for reasons set out hereinafter. It is however preferred that a dedicated power line or umbilical (not shown) is provided between the deployment vessel and the frame 12. Each of the guidelines 14 is preferably wound onto a suitable winch or the like located on the barge, in order to allow the frame 12 to be raised and lowered relative to the barge. The frame 12, in the embodiment illustrated, is manufactured from tubular steel, although it will be appreciated that the materials and design of the frame 12 may vary once retaining the underlying functionality as described hereinafter.

Figure 7:
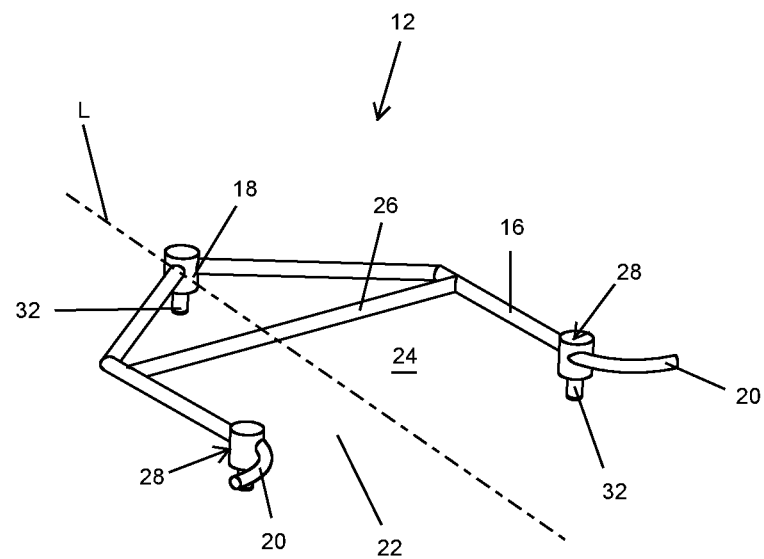
FIG. 7 illustrates a perspective view of the recovery frame, showing one form of guide thereon.
Figure 8:
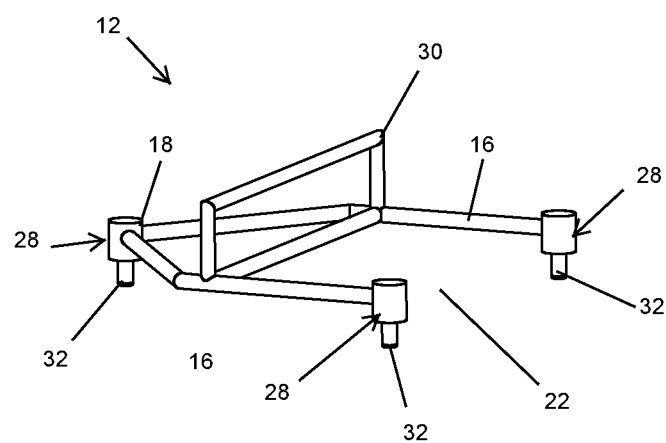
FIG. 8 illustrates a perspective view of the recovery frame, showing a further form of guide thereon.

Referring in particular to FIGS. 7 and 8 it can be seen that the frame 12 is substantially u-shaped in plan and includes a pair of arms 16 that, in the latter half thereof, taper towards one another and are connected at an apex 18. Each of the arms 16 terminate in a fixed or immovable guide 20 (only shown in FIG. 7) which curve outwardly away from a longitudinal axis L of frame 12. The free ends of the arms 16, as defined by the guides 20, define a mouth 22 of the frame 12 that permits access to a docking space 24 defined by the frame 12. This docking space 24 terminates, in the direction of the longitudinal axis L, at a third guide in the form of a cross member 26. The cross member 26 acts as a buffer which in use, and as will be described hereinafter, makes contact with the outer face of the turbine T as the frame 12 is advanced into position, in order to prevent the frame 12 from being advanced beyond its intended position. The cross member 26 is shown in full detail in FIG. 8, while in the remaining drawings is shown in reduced detail for the purposes of clarity.

The recovery system 10 additionally comprises three couplers 28 provided on and projecting vertically downward from the frame 12, one at the free end of each of the arms 16 and the remaining coupler 28 at the apex 18. The base B is provided with co-operating and correspondingly positioned couplers 30 which form an integral part of the base B, and are therefore capable of bearing the combined load of the turbine T and base B as the two are being raised from the seabed, again as will be described in detail hereinafter. The couplers 30 on the base are preferably in the form of a cylindrical sleeve into which the couplers 28 may be located and then locked in position as described below. In the embodiment illustrated the couplers 30 are defined by and formed in the legs of the base B, although it will be appreciated that the position of each of the couplers 30 may be varied depending on the overall design and/or dimensions of the base B.

In the embodiment illustrated the couplers 28 on the frame 12 each comprise a lifting tool 28 comprising a cylindrical gripping member 32 which projects vertically downwards from the arm 16 of the frame 12. The gripping member 32 comprises an array of gripping elements (not shown) covering a substantial area of the outer surface of the gripping member 32, and which may be displaced outwardly to stand proud of said surface, preferably via hydraulic actuation. In use each of the gripping members 32 is positioned internally of the respective coupler 30 provided on the base B, and the gripping elements (not shown) are then displaced outwardly in order to engage and grip the interior surface of said coupler 30. The hydraulic or other power to effect operation of the lifting tools 28 may be provided from the barge (not shown) via the guidelines 14 or secondary lines (not shown), but preferably via a dedicated power cable or umbilical (not shown). The open upper end of the couplers 30 may taper outwardly to define a funnel shaped opening via which the gripping member 32 are introduced, in order to assist in guiding the gripping members 32 into the couplers 30. It is envisaged that the lifting tools 28 and/or the couplers 30 may be secured to the frame 12 or base B via floating mountings (not shown) which will allow some play in order to reduce the accuracy required to effect registration of the lifting tools 28 with the couplers 30.

Turning then to the operation of the recovery system 10, the frame 12 is initially fastened directly to the underside of the barge, at a suitable location such as a dock or the like. The power cable or umbilical (not shown) may then be connected between the deployment vessel and the frame 12, which during the recovery operation will provide power to the lifting tools 28, in addition to any sensors on board the frame 12. The barge is then transported to the deployment site of the turbine T and base B, whether being towed by a tug (not shown) or under its own power source. The exact position of the turbine T is known, and is maintained using GPS and a marker buoy for reference or by Dynamic Positioning (DP) on the surface of the sea above the deployment site. The barge can then be accurately positioned relative to the turbine T, in order to begin recovery of both the turbine T and base B in a single operation.

Figure 1:
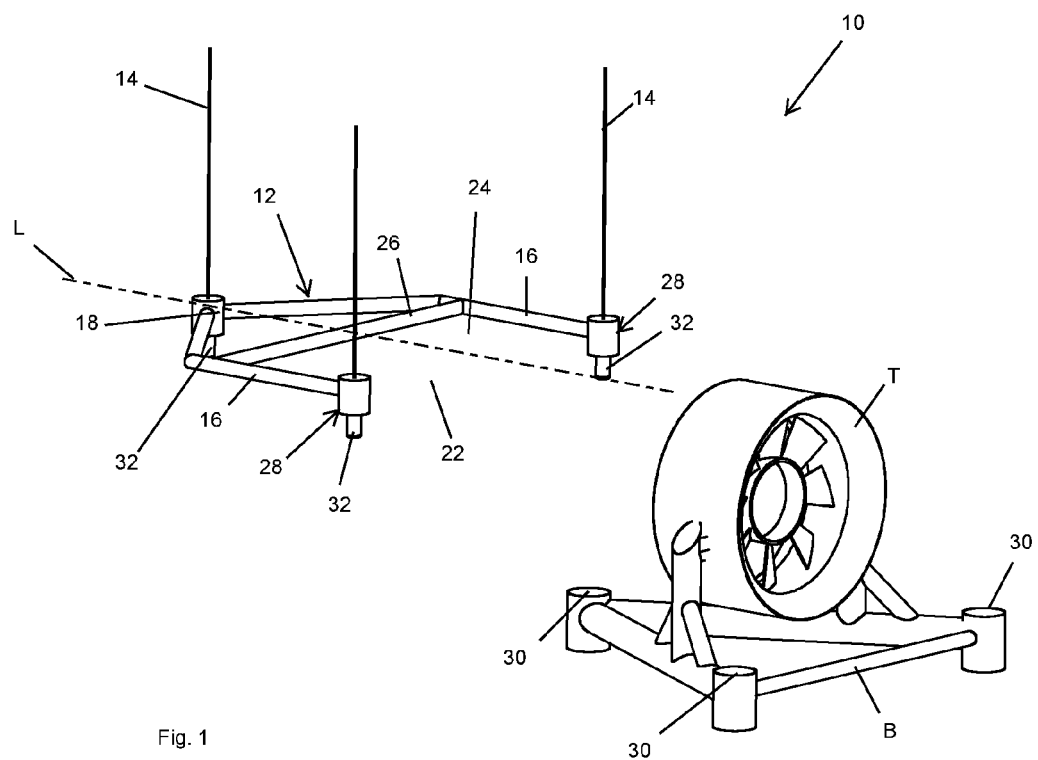
FIG. 1 illustrates a perspective view of a hydroelectric turbine recovery system according to an embodiment of the present invention, being advanced towards a base mounted turbine.
Figure 2:
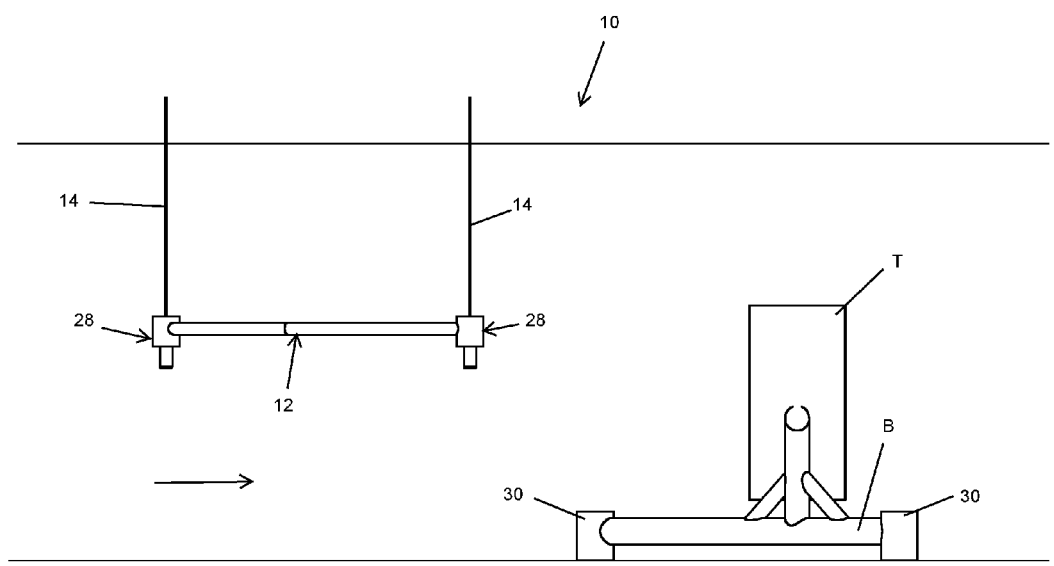
FIG. 2 illustrates a side elevation of the arrangement shown in FIG. 1.

On reaching the turbine T the barge is preferably positioned slightly downstream or down tide of the turbine T and base B relative to the direction of tidal flow. The frame 12 is then lowered on the guidelines 14 until the frame 12 is at the same horizontal co-ordinate as the turbine T, and as illustrated in FIGS. 1 and 2. By deploying the frame 12 during a running tide and directly down tide of the turbine T the flow of the tide will be in a direction substantially parallel with the longitudinal axis L of the frame 12. The tidal flow of water past the frame 12 will tend to maintain the correct alignment of the frame 12 relative to the turbine T and base B. In addition, the power cable or umbilical (not shown) providing power from the deployment vessel to the frame 12 will need to be managed during the recovery process, and by positioning the frame 12 down tide of the turbine T, the power cable (not shown) can simply be deposited off the back of the deployment vessel and thus into the water down tide of the frame 12. The running tide will then ensure that the power cable remains down tide of the frame 12 during the entire recovery process and will thus not pose an obstacle to the operation. By advancing the barge and frame from a down tide position, a failsafe is then built into the operation in the event of a power loss to the barge or tug, which will result in the frame 12 drifting away from the turbine T and thus avoiding the possibility of the frame 12 contacting and damaging the turbine T.

At this point the barge, with the frame 12 suspended therebeneath, is advanced towards the turbine T and base B, preferably in a direction substantially parallel with the longitudinal axis L of the frame 12, and with the mouth 22 leading. The frame 12 may be advanced by advancing the tug to which the barge is tied, or as an alternative the tug may be correctly positioned and then winch the barge and frame upstream. It is preferable that the frame 12 is provided with a number of sensors (not shown) for monitoring the position/condition of the frame 12 during the recovery operation. These sensors may be in the form of one or more cameras or imaging sonar, in order to provide visual feedback during the operation, even when the water is not clear, has high turbidity, or during night time operations.

Figure 3:
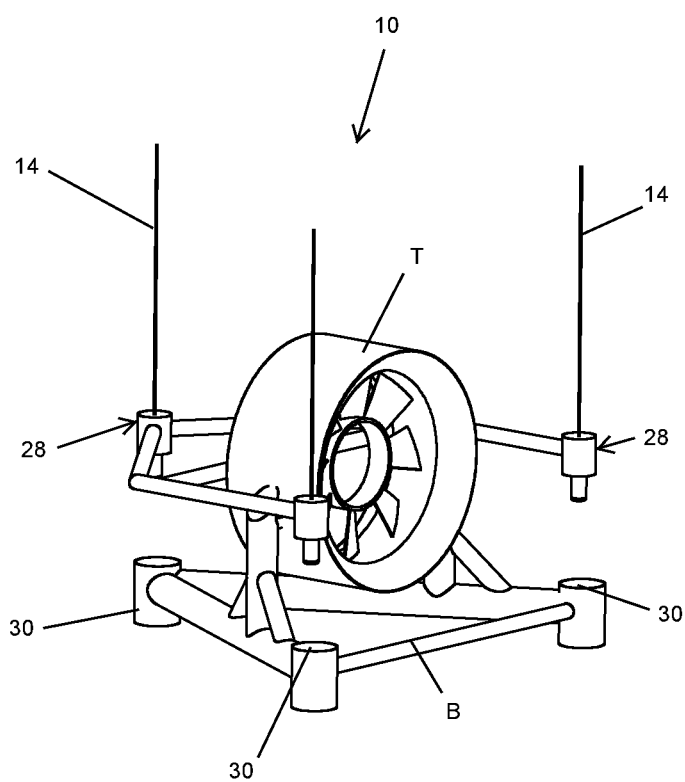
FIG. 3 illustrates the recovery system shown in FIG. 1 with a frame of the system having been brought into register with the turbine.
Figure 4:
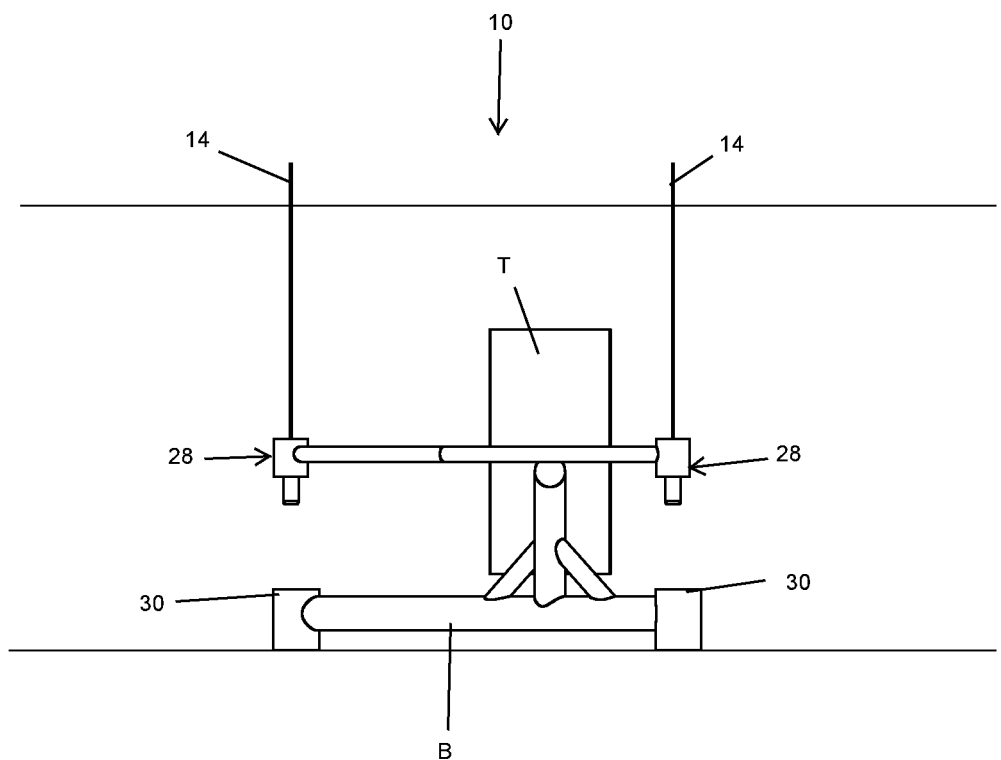
FIG. 4 illustrates a side elevation of the arrangement shown in FIG. 3.

The frame 12 will thus slowly approach the turbine T, and if there is any misalignment between the two the pair of guides 20, which are only illustrated in FIG. 7, will serve to gently correct the position of the frame 12 such that the turbine T passes through the mouth 22 and into the docking space 24 defined within the frame 12. The horizontal displacement of the frame 12 around the turbine T continues until the cross member 26 contacts the face of the turbine T, thereby arresting the further horizontal displacement of the frame 12. The cross member 26 is positioned such that when it contacts the outer face of the turbine T each of the lifting tools 28 will be positioned directly above the respective coupler 30 on the base B, as illustrated in FIGS. 3 and 4. The frame 12 may also be provided with additional sensors to indicate contact with the turbine T, such as load cells (not shown) which can monitor for contact. Once these sensors indicate contact between the frame 12 and the turbine T, the frame 12 can be halted. It is preferable, at this stage, to advance the barge slightly up tide in order to place some tension in the guidelines 14 in order to hold the frame 12 securely against the turbine T. Due to turbulence and/or fluctuations in the velocity of the tidal flow, an increase in the velocity may temporarily displace the frame 12 down tide of the turbine T, and once the increased tidal flow reduces the frame 12 will then swing back towards and contact the turbine T. This swinging of the frame 12 may therefore result in damage to the turbine T or the frame 12. By placing tension in the guidelines 14 the frame 12 will be held securely against the turbine T even during such tidal fluctuations.

Figure 5:
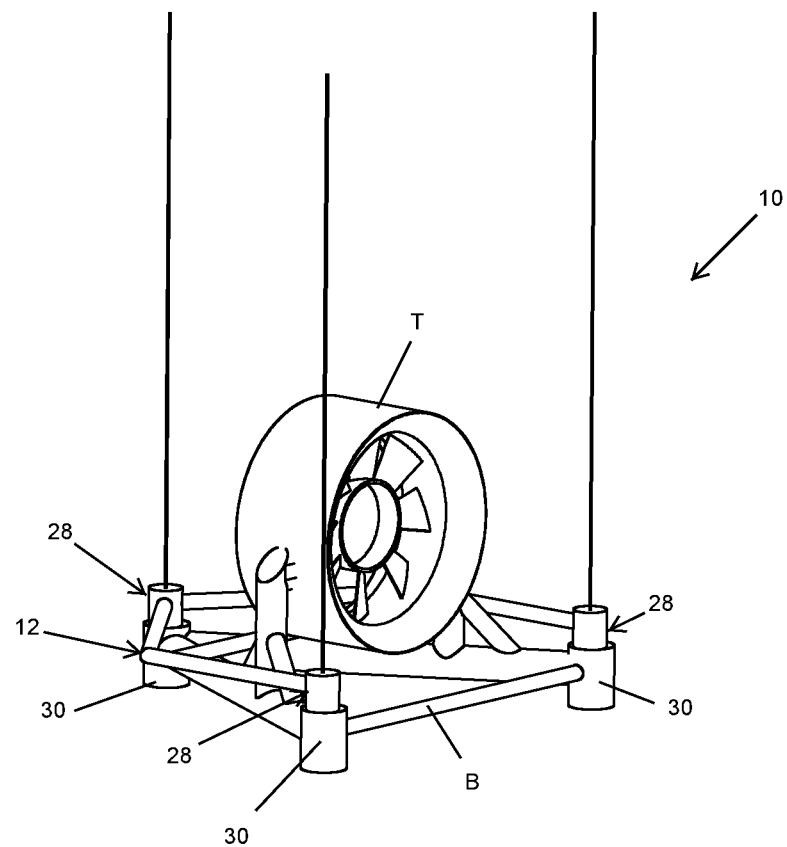
FIG. 5 illustrates the recovery system shown in FIGS. 1 to 4 in which the frame has been lowered and locked onto the base in order to permit recovery thereof.
Figure 6:
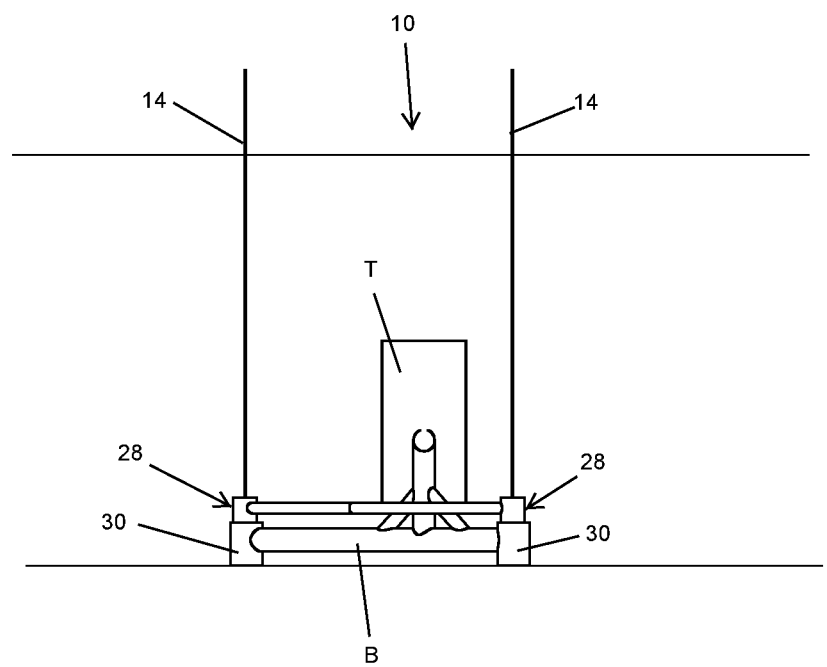
FIG. 6 illustrates a side elevation of the arrangement shown in FIG. 5.

At this point the barge is halted and maintained in position directly above the turbine T and base B. The guidelines 14 are then used to slowly lower the frame 12 in the vertical direction, whereby each of the lifting tools will be inserted into the respective coupler 30 on the base B, as illustrated in FIGS. 5 and 6. Once the frame 12 has been fully lowered into position the guidelines 14 will begin to go slack, at which point the winches lowering the frame 12 are stopped. The lifting tools 28 are then actuated, whereby the gripping elements (not shown) are projected outwardly in order to grip the cylindrical inner surface of the couplers 30, thereby locking the lifting tools 28 to the couplers 30.

It is envisaged that the vertical orientation of the couplers 28, 30 could be altered, for example being in a horizontal orientation. With such an arrangement it would then only be necessary to advance the frame 12 horizontally into engagement with the base 12, although a greater degree of accuracy in the initial horizontal positioning of the frame 12 would be required. It should also be appreciated that the lifting tools 28 and corresponding couplers 30 could be substituted with any other suitable means of connecting and securing the frame 12 to the base B, for example using hooks, collets, or other forms of mechanical fasteners. It is also to be understood that while the system 10 of the embodiment illustrated is designed to recover a triangular base B, and is thus comprises of three lifting tools 28, the system 10 may be reconfigured to recovery alternative styles of base, for example a rectangular base or the like, and may therefore comprise more or less that the three lifting tools 28 of the embodiment illustrated.

The frame 12 is now securely locked to the base B, and on which the turbine T is itself fixed. The winches can now be reversed in order to haul up the guidelines 14, thereby lifting the turbine T and base B as a single unit, off the seabed. It may be necessary to lift each leg of the base B individually in order to help break any settling effects at the legs. This can be achieved by individually raising each guideline 14 until the respective leg breaks free of the seabed, at which point that leg can then be lowered back down and the next leg then raised. Once all of the legs have been freed from the seabed the frame 12 is preferably raised fully against the underside of the barge, which is designed to allow the turbine T to pass upwardly through an opening therein. At this point the frame 12 is safely secured to the barge, which can then transport the base B and turbine T ashore.

It will thus be appreciated that by using an open sided frame having a mouth 22 to accept the turbine T, and the provision of the guides 20 and cross member 26, the frame 12 can be positioned and secured to the base B with relative ease and without the requirement for divers or other personnel to be on the seabed during the operation. As a result the turbine T and base B can be recovered as a single unit, avoiding the need to separate the two while on the seabed. This also ensures that once transported ashore, the turbine T is still fixed to the base B, and so the turbine T can remain fully supported by the base B on land, where an inspection and/or suitable repairs can then be made. This avoids the requirement for transferring the turbine T to a separate support, which would be a difficult and time consuming operation, and increases the risk of damage to the turbine T.

The invention claimed is:

1. A hydroelectric turbine recovery system for recovering a hydroelectric turbine mounted on a base, the system comprising:

a hydroelectric turbine mounted on a base; and a frame having an opening permitting the frame to be advanced around the hydroelectric turbine via the opening, and having a plurality of couplers engagable with the base, wherein the frame is configured to be raised and lowered via guidelines and wherein the hydroelectric turbine and the base are separate and detached from the frame and guidelines prior to the couplers engaging with the base.

2. A recovery system according to claim 1, further comprising corresponding couplers on the base engagable with the plurality of couplers on the frame.

3. A recovery system according to claim 2 in which the couplers on the frame and the couplers on the base are arranged to be brought into registration through vertical movement relative to one another.

4. A recovery system according to claim 1 in which the frame is substantially U shaped.

5. A recovery system according to claim 1 in which the frame comprises one or more guides to assist in aligning the frame with the base.

6. A recovery system according to claim 5 in which the one or more guides are immovably fixed in position.

7. A recovery system according to claim 5 in which at least one of the guides comprises a buffer positioned to engage the turbine and/or base when the frame is substantially aligned with the base in order to arrest further displacement of the fame relative to the base.

8. A recovery system according to claim 7 in which the buffer comprising a cross member extending between a pair of opposed arms of the frame.

9. A recovery system according to claim 7 in which the buffer is resiliently deformable whereby damage to the turbine and/or base on contact therewith is inhibited.

10. A recovery system according to claim 2 in which the couplers on the frame each comprise a hydraulically actuated lifting tool and the couplers on the base each comprise a corresponding dock within which the lifting tool is reversibly lockable.

11. A recovery system according to claim 1 comprising one or more sensors operable to detect contact and correct alignment between the frame and the turbine and/or base.

12. A recovery system according to claim 1 comprising one or more imaging sensors.

13. A method of recovering a base mounted hydroelectric turbine from the seabed, the method comprising the steps of:

lowering a recovery frame having an opening from a deployment vessel into a position laterally adjacent the base;

advancing the frame around the turbine via the opening;

coupling the frame to the base via engaging couplers within the frame to the base; and lifting the base, the turbine and the frame off the seabed as a single unit;

wherein the frame is configured to be raised and lowered via guidelines and wherein the hydroelectric turbine and the base are separate and detached from the frame and guidelines prior to the couplers engaging with the base.

14. A method according to claim 13 comprising, prior to the step of coupling the frame to the base, substantially vertically lowering the frame into engagement with the base.

15. A method according to claim 13 comprising the step of: arresting the lateral displacement of the frame, when substantially aligned with the base, through contact with the turbine of a buffer mounted to the frame.

16. A method according to claim 13 comprising, in the step of coupling the frame to the base, inserting the couplers on the frame into a corresponding plurality of couplers on the base.

17. A method according to claim 13 comprising the step of performing the method in a running tide; and positioning the recovery frame down tide of the turbine prior to lowering the frame into position laterally adjacent the turbine.

18. A method according to claim 13 comprising the step of providing power to the recovery frame via a power cable connected between the deployment vessel and the frame; and managing the cable by positioning the cable in the water down tide of the frame.

* * * * *